United States Patent Office 3,825,487
Patented July 23, 1974

3,825,487
METHOD FOR SIMULTANEOUSLY PRODUCING SYNTHETIC NATURAL GAS AND HIGH OCTANE REFORMATE
Frederick C. Wilhelm, Arlington Heights, Ill., assignor to Universal Oil Products Company, Des Plaines, Ill.
No Drawing. Filed Sept. 5, 1972, Ser. No. 286,652
Int. Cl. C10g 35/06
U.S. Cl. 208—139
11 Claims

ABSTRACT OF THE DISCLOSURE

A synthetic natural gas stream and a high octane reformate stream are produced by contacting a hydrocarbon charge stock boiling in the gasoline range and hydrogen, at synthetic natural gas production conditions, with a catalytic composite comprising a porous carrier material containing, on an elemental basis, about 0.01 to about 2 wt. percent of a platinum group metal, about 1 to about 5 wt. percent nickel and about 0.01 to about 5 wt. percent of a Group IVA metal. Synthetic natural gas production conditions generally utilized include a temperature of about 900 to about 1200° F., a pressure of about 0 to about 350 p.s.i.g., liquid hourly spaced velocity about 0.5 to about 3 hrs.$^{-1}$ and a mole ratio of hydrogen to hydrocarbon of about 1:1 to about 5:1.

DISCLOSURE

The subject of the present invention is a novel selective method for the simultaneous production of synthetic natural gas and high octane reformate from a hydrocarbon charge stock boiling in the gasoline range. More particularly, the present invention is a catalytic method for the selective production of a synthetic natural gas stream and a high octane reformate from a gasoline charge stock which method utilizes a novel catalyst, comprising a porous carrier material containing catalytically effective amounts of the platinum group metal, nickel and a Group IVA metal for the purpose of enabling the selective cracking of paraffins and other components of the hydrocarbon charge stock to methane coupled with the acceleration of reaction leading to the formation of a high octane reformate while simulaneously inhibiting the cracking reactions leading to $C_2$ through $C_4$ hydrocarbons. The basic concept of the disclosed method essentially involves recognition that a trimetallic catalyst containing a platinum group metal, nickel and a Group IVA metal can be utilized to selectively produce substantial amounts of methane relative to the production of other light hydrocarbons in a catalytic reforming process if a relatively large amount of nickel is incorporated in the catalyst. "Relatively large amounts of nickel" in this context means an amount of nickel component sufficient to result in the catalyst containing, on an elemental basis, about 1 to about 5 wt. percent nickel.

Synthetic natural gas (commonly called SNG) is a gaseous mixture consisting essentially of methane, with minor amounts of hydrogen and other light hydrocarbons, having a gross heating value which is equivalent to that generally obtained with a pipeline-grade natural gas stream. In particular, it is a gas stream containing a high proportion of methane preferably a gas stream consisting almost entirely of methane, so that it is similar or interchangeable with a natural gas stream. Like natural gas, synthetic natural gas has excellent combustion characteristics and fluid properties so that it is highly regarded for use as a fuel for residential, commercial and industrial uses. Similarly SNG can be employed as a substitute for natural gas, or in admixture therewith, in any of the other well known industrial uses for natural gas streams such as production of hydrogen, ammonia, carbon black, and the like products. Like natural gas, synthetic natural gas can, if the economics warrant it, be converted via a modified Fisher-Tropsch synthesis reaction into a mixture of various hydrocarbons, primarily straight chain paraffins and olefins, and a mixture of oxygenated hydrocarbons such as the common alcohols, acids, ketones and the like materials. With the advent of general public recognition that the supply of natural gas is rapidly being exhausted in the United States, attention within the petroleum industry has been directed at the development of alternative sources of supply for this economically critical material. Besides intensifying the search for new sources of natural gas, the response of the petroleum industry has included a review of the known reaction paths that are available for sythesizing synthetic natural gas streams from other, relatively less expensive and generally available materials such as coal and heavier hydrocarbon streams.

One solution to the problem of producing synthetic natural streams that has been exhaustively researched involves the medium-temperature gasification of light hydrocarbons, in particular, the relatively low boiling fraction of a crude oil, in steam. The technology for this last procedure has been relatively highly developed because hydrogen is generally produced commercially by a similar type procedure and this last procedure requires only minor modifications, involving the addition of one or two stages of a methanization reaction, in order to produce a synthetic natural gas stream. However, despite the availability of this catalytic steam-reforming route to synthetic natural gas there remains a substantial need for a relatively simple method of making a synthetic natural gas stream without the burden of going to a complicated and expensive catalytic steam-reforming type of solution. In particular, in many modern petroleum refineries the amount of synthetic natural gas required does not warrant the expense of constructing an entirely separate catalytic steam-reforming process for its production. Therefore, there exists a number of commercial situations where it would be advantageous to have a source of synthetic natural gas in a petroleum refinery which would not be dependent on the construction and operation of a catalytic steam reforming unit. This suggests that there is a substantial need for a method of modifying a traditional, widely used refinery process, catalytic reforming of low octane gasoline fractions, to enable it to produce an SNG stream.

Accordingly, the problem addressed by the present invention involves the modification of the conventional catalytic reforming process so that it can make substantial quantities of SNG and a high octane reformate without substantially increasing the undesired $C_2$ to $C_4$ by-products of such a modified process.

It has been widely recognized that a conventional gasoline reforming process produces some quantity of methane. However, when attempts have been made to modify a conventional catalytic reforming process to increase the production of methane, several adverse effects have been uniformally experienced. Namely, the production of $C_2$ to $C_4$ hydrocarbons is similarly increased, hydrogen production is difficult to sustain, the rate of deposition of hydrocarbonaceous deposits on the catalyst increases with corresponding decrease in catalyst activity and increase in frequency of regeneration, and the process becomes more difficult to control. In other words, operating a conventional catalytic reforming process to produce substantial quantities of methane requires severity levels that substantially degrade the overall stability of the process and disproportionately effect the high octane reformate yield of such a process. The principal contributing cause for this situation is the fact that in such a modified process methane production is only achieved at the expense of high octane reformate yield loss with concomitant increase in the production of other light gases. This essentially means that the selectivity for methane remains substantially constant and the increased production of same is achieved primarily at the expense of $C_5+$ yield.

The conception of the present invention emanated from a search for a catalyst that would increase the selectivity for methane production at the expense of yield of other light gases rather than at the expense of the high octane reformate product of a catalytic reforming process. In other words, my basic idea was to find a reforming catalyst, and appropriate conditions for using same, which inherently possessed a high selectivity for methane, a low selectivity for other light gases (i.e. $C_2$ to $C_4$ hydrocarbons) and still maintain a relatively high selectivity for $C_5+$ yield. I have now found such a catalyst and consequently have also found a method for modifying a conventional catalytic reforming process to produce SNG and a high octane reformate in a highly efficient manner. Central to my discovery in this area is the recognition that a catalyst containing a platinum group metal, nickel, and a Group IVA metal in association with a porous carrier material can be altered to enable the selective production of SNG. I have discerned that the principal modification required for this catalyst to enable selective SNG production is an increase in the amount of the nickel component to a relatively large value as measured by the customary convention for metal levels in reforming catalysts; that is, my finding is that the amount of nickel contained in this type of catalyst must be greater than about 1 wt. percent thereof, on an elemental basis, in order to see substantially increased selectivity for SNG gas. In essence then my process for the production of SNG and a high octane reformate involves the modification of a conventional catalytic reforming process in the following manner: (1) use of a catalyst comprising a porous material, preferably alumina, containing, on an elemental basis, about 0.01 to about 2 wt. percent of a platinum group metal, about 1 to about 5 wt. percent nickel and 0.01 to about 5 wt. percent of a Group IVA metal, particularly tin; and (2) operation of the modified process at synthetic natural gas production conditions which generally comprise a temperature of about 900 to about 1200° F., a pressure of about 0 to about 350 p.s.i.g.; a liquid hourly space velocity of about 0.5 to about 3 hr.$^{-1}$ and a mole ratio of hydrogen to hydrocarbon of about 1:1 to about 5:1.

It is, accordingly, a principal object of the present invention to provide a catalytic reforming method which is capable of producing not only a high octane reformate stream but also a synthetic natural gas stream. Another object is to provide a procedure for modifying a conventional catalytic reforming process to enable it to selectively produce methane without any substantial sacrifice in $C_5+$ yield. Still another object is to provide a method for shifting the selectivity of the light gas make in the catalytic reforming process away from the production of $C_2$ to $C_4$ hydrocarbons and towards methane.

Against this background, the present invention is in one embodiment a method for simultaneously producing a synthetic gas stream and a high octane reformate stream. The method comprises contacting a hydrocarbon charge stock boiling in the gasoline range and hydrogen, at synthetic natural gas production conditions, with a catalytic composite comprising a porous carrier material containing, on an elemental basis, about 0.01 to about 2 wt. percent of the platinum group metal, about 1 to about 5 wt. percent nickel, and about 0.01 to about 5 wt. percent of a Group IVA metal.

Another embodiment involves a method as described above in the first embodiment wherein the catalyst comprises alumina containing, on an elemental basis, about 0.01 to about 2 wt. percent platinum, about 1 to about 5 wt. percent nickel, about 0.1 to about 3.5 wt. percent halogen and about 0.05 to about 2 wt. percent tin.

A third embodiment of the present invention involves a method as outlined above in the first embodiment wherein the synthetic natural gas production conditions include a temperature of about 900 to about 1200° F., a pressure of about 0 to about 350 p.s.i.g., a liquid hourly space velocity of 0.5 to about 3 hr.$^{-1}$ and a mole ratio of hydrogen to hydrocarbon of about 1:1 to about 5:1.

Yet another embodiment involves a process as outlined above in the first embodiment wherein the amount of carbon formed on the catalyst is held to relatively low levels by continuously regenerating the catalyst at a catalyst life of about 100 to about 500 hours.

Other embodiments and objects of the present invention relate to additional details regarding essential catalytic components, amounts of catalytic components to be used in the instant catalyst, preferred methods of catalyst preparations, preferred operating conditions for use in the disclosed method and the like particulars which are hereinafter given in the following detailed discussion of each of those facets of the present invention.

An essential feature of the present invention involves the use of a catalytic composite comprising a porous carrier material containing hereinafter specified amounts of a platinum group metal, nickel, a Group IVA metal and in the preferred case a halogen component. Considering first the porous carrier material, it is preferred that the material be a porous, adsorptive, high-surface area support having a surface area of about 25 to about 500 m.$^2$/g. The porous carrier material should be relatively refractory to the conditions utilized in the hydrocarbon conversion process, and it is intended to include within the scope of the present invention carrier materials which have traditionally been utilized in dual-function hydrocarbon conversion catalysts such as: (1) activated carbon, coke, or charcoal; (2) silica or silica gel, silicon carbide, clays, and silicates including thoe synthetically prepared and naturally occurring, which may or may not be acid treated, for example, attapulgus clay, china clay, diatomaceous earth, fuller's earth, kaoline, kieselguhr, etc.; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica magnesia, chromia-alumina, aluminaboria, silica-zirconia, etc.; (5) crystalline aluminosilicates such as naturally occurring or synthetically prepared mordenite and/or faujasite, either in the hydrogen form or in a form which has been treated with multivalent cations; and (6) combination of elements from one or more of these groups. The preferred porous carrier materials for use in the present invention are refractory inorganic oxides, with best results obtained with an alumina carrier material. Suitable alumina materials are the crystalline aluminas known as the gamma-, eta-, and theta-aluminus, with gamma- alumina giving best results. In addition, in some embodiments, the alumina carrier material may contain minor proportions of other well known refractory inorganic oxides such as silica, zirconia, magnesia, etc.; however, the preferred support is substantially pure gamma-alumina. Preferred carrier materials have an apparent bulk density of about 0.3 to about 0.7 g./cc. and surface area characteristics such that the average pore diameter is about 20 to 300 Angstroms, the pore volume is about 0.1 to about 1 ml./g. and the surface area is about 100 to about 500 m.$^2$/g. In general, excellent results are typically obtained with a gamma-alumina carrier material which is used in the form of spherical particles having: a relatively small diameter (i.e., typically about 1/16 inch), an apparent bulk density of about 0.5 g./cc., a pore volume of about 0.4 ml./g., and a surface area of about 175 m.$^2$/g.

The preferred alumina carrier material may be prepared in any suitable manner and may be synthetically prepared or natural occurring. Whatever type of alumina is employed it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina carrier may be formed in any desired shape such as spheres, pills, cakes, extrudates, powders, granules, etc., and utilized in any desired size. For the purpose of the present invention a particularly preferred form of alumina is the sphere; and alumina spheres may be continuously manufactured by the well known oil drop method which comprises: forming an alumina hydrosol by any of the techniques taught in the art preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. to about 400° F. and subjected to a calcination procedure at a temperature of about 850° F. to about 1300° F. for a period of about 1 to about 20 hours. This treatment effects conversion of the alumina hydrogel to the corresponding crystalline gamma-alumina. See the teachings of U.S. Pat. No. 2,620,314 for additional details.

One essential constituent of the catalytic composite used in the present method is the Group IVA metallic component. By the use of the generic term "Group IVA metallic component" it is intended to cover the metals and compounds of the metals of Group IVA of the Periodic Table. More specifically, it is intended to cover: germanium and the compounds of germanium; tin and the compounds of tin; lead and the compounds of lead; and mixtures of these metals and/or compounds of metals. This Group IVA metallic component may be present in the catalytic composite as an elemental metal, or in chemical combination with one or more of the other ingredients of the composite; or as a chemical compound of the group IVA metal such as the oxide, sulfide, halide, oxyhalide, oxychloride, aluminate, and the like compounds. Based on the evidence currently available, it is believed that best results are obtained when the Group IVA metallic component exists in the final composite in an oxidation state above that of the elemental metal, and the subsequently described oxidation and reduction steps, that are preferably used in the preparation of the instant composite, are believed to result in a catalytic composite which contains an oxide of the Group IVA metallic component such as germanium oxide, tin oxide and lead oxide. Regardless of the state in which this component exists in the composite, it can be utilized therein in any amount which is catalytically effective, with the preferred amount being about 0.01 to about 5 wt. percent thereof, calculated on an elemental basis. The exact amount selected within this broad range is preferably determined as a function of the particular Group IVA metal that is utilized. For instance, in the case where this component is lead, it is preferred to select the amount of this component from the low end of this range—namely, about 0.01 to about 1 wt. percent. In the case where this component is tin, it is preferred to select from a relatively broader range of about 0.05 to 2 wt. percent thereof. And where this component is germanium, the selection can be made from the full breadth of the stated range—specifically, about 0.01 to about 5 wt. percent, with best results at about 0.05 to about 2 wt. percent.

This Group IVA component may be incorporated in the composite in any suitable manner known to the art such as by coprecipitation or cogelation with the porous carrier material, ion exchange with the carrier material, or impregnation of the carrier material at any stage in its preparation. It is to be noted that it is intended to include within the scope of the present invention all conventional procedures for incorporating a metallic component in a catalytic composite, and the particular method of incorporation used is not deemed to be an essential feature of the present invention. However, best results are believed to be obtained when the Group IVA component is uniformly distributed throughout the porous carrier material. One acceptable method of incorporating the Group IVA component into the catalytic composite involves cogelling the Group IVA component during the preparation of the preferred carrier material, alumina. This method typically involves the addition of a suitable soluble compound of the Group IVA metal of interest to the alumina hydrosol. The resulting mixture is then commingled with a suitable gelling agent, such as a relatively weak alkaline reagent, and the resulting mixture is thereafter preferably gelled by dropping into a hot oil bath as explained hereinbefore. After aging, drying and calcining the resulting particles there is obtained an intimate combination of the oxide of the Group IVA metal and alumina. One preferred method of incorporating this component into the composite involves utilization of a soluble, decomposable compound of the particular Group IVA metal of interest to impregnate the porous carrier material either before, during or after the carrier material is calcined. In general, the solvent used during this impregnation step is selected on the basis of its capability to dissolve the desired Group IVA compound without affecting the porous carrier material which is to be impregnated; ordinarily, good results are obtained when water is the solvent; thus the preferred Group IVA compounds for use in this impregnation step are typically water-soluble and decomposable. Examples of suitable Group IVA compounds are: germanium difluoride, germanium tetrafluoride, germanium monosulfide, tin dibromide, tin dibromide di-iodide, tin dichloride, di-iodide, tin chromate, tin difluoride, tin tetrafluoride, tin tetraiodide, tin sulfate, tin tartrate, lead acetate, lead bromate, lead bromide, lead chlorate, lead chloride, lead citrate, lead formate, lead lactate, lead malate, lead nitrate, lead nitrite, lead dithionate, and the like compounds. In the case where the Group IVA component is germanium, a preferred impregnation solution is germanium tetrachloride dissolved in anhydrous ethanol. In the case of tin, tin chloride dissolved in water is preferred. And in the case of lead, lead nitrate in water is preferred. Regardless of which impregnation solution is utilized, the Group IVA component can be impregnated either prior to, simultaneously with, or after the other metallic components are added to the carrier material. Ordinarily, best results are obtained when this component is impregnated simultaneously with the other metallic components of the composite. Likewise, best results are ordinarily obtained when the Group IVA component is tin or a compound of tin.

Regardless of which Group IVA compound is used in the preferred impregnation step, it is important that the Group IVA metallic component be uniformly distributed throughout the carrier material. In order to achieve his objecive it is necessary to maintain the pH of the impregnation solution in a range of about 1 to about 7 and to dilute the impregnation solution to a volume which is substantially in excess of the volume of the carrier material which is impregnated. It is preferred to use a volume ratio of impregnation solution to carrier material of at least 1.5:1 and preferably about 2:1 to about 10:1 or more. Similarly, it is preferred to use a relatively long contact time during the impregnation step ranging from about ¼ hour up to about ½ hour or more before drying to remove excess solvent in order to insure a high dispersion of the Group IVA metallic component on the carrier material. The carrier material is, likewise preferably constantly agitated during this preferred impregnation step.

A second essential ingredient of the catalyst used in the instant method is the platinum group component. Although the method of the present invention is specifically directed to the use of a catalytic composite containing platinum, it is intended to include other platinum group metals such as palladium, rhodium, ruthenium, osmium, and iridium. The platinum group component such as platinum, may exist within the final catalytic composite as a compound such as an oxide, sulfide, halide, etc., or as an elemental metal. Generally, the amount of the platinum group component present in the final catalyst composite is small compared to the quantities of the other components combined therewith. In fact, the platinum group component generally comprises about 0.01 to about 2 wt. percent of the final catalytic composite, calculated on an elemental basis. Excellent results are obtained when the catalyst contains about 0.05 to about 1 wt. percent of the platinum group metal. The preferred platinum group component is platinum or a compound of platinum, although good results are obtained when it is palladium or a compound of palladium.

The platinum group component may be incorporated in the catalytic composite in any suitable manner such as coprecipitation or cogelation, ion-exchange, or impregnation. The preferred method of preparing the catalyst involves the utilization of a soluble, decomposable compound of a platinum group metal to impregnate the carrier material. Thus, the platinum group component may be added to the support by commingling the latter with an aqueous solution of chloroplatinic acid. Other water-soluble compounds of platinum group metals may be employed in impregnation solutions and include ammonium chloroplatinate, bromoplatinic acid, platinum dichloride, platinum tetrachloride hydrate, platinum dichlorocarbonyl dichloride, dinitrodiaminoplatinum, palladium chloride, palladium nitrate, palladium sulfate, etc. The utilization of a platinum chloride compound, such as chloroplatinic acid is preferred since it facilitates the incorporation of both the platinum component and at least a minor quantity of the preferred halogen component in a single step. Hydrogen chloride or the like acid is also generally added to the impregnation solution in order to further facilitate the incorporation of the halogen component and the distribution of the metallic component. In addition, it is generally preferred to impregnate the carrier material after it has been calcined in order to minimize the risk of washing away the valuable platinum metal compounds; however, in some cases it may be advantageous to impregnate the carrier material when it is in a gelled state.

Yet another essential ingredient of the catalytic composite used in the present invention is a nickel component. This component may be present in the composite as an elemental metal, or in chemical combinations with one or more of the other ingredients of the composite, or as a chemical compound of nickel such as nickel oxide, sulfide, halide, oxychloride, aluminate and the like. Best results are believed to be obtained when the composite contains this component in the elemental state. In accordance with the present invention, the amount of the nickel component utilized in the composite is critical; that is, one of my basic findings is that the amount of the nickel component contained in the catalyst used in the present invention must be sufficient to provide at least about 1 wt. percent nickel, calculated on an elemental basis, in the catalyst, and preferably the amount of nickel is selected from the range of about 1 to about 5 wt. percent thereof, calculated on an elemental nickel basis. Typically, best results are obtained when the catalyst used contains about 1.5 to about 3 wt. percent nickel. In fact, as will be shown in the example, excellent results have been obtained with a catalyst containing 1.75 wt. percent nickel, calculated on an elemental basis.

The nickel component may be incorporated into the catalytic composite in any suitable manner known to those skilled in the catalyst formulation art. In addition, it may be added at any stage of the preparation of the composite either during preparation of the carrier material or thereafter—since the precise method of incorporation used is not deemed to be critical. However, best results are thought to be obtained when the nickel component is relatively uniformly distributed throughout the carrier material, and the preferred procedures are the ones that are known to result in a composite having a relatively uniform distribution. One acceptable procedure for incorporating this component into the composite involves cogelling the nickel component during the preparation of the preferred carrier material, alumina. This procedure usually comprehends the addition of a soluble, decomposable, compound of nickel such as nickel chloride to the alumina hydrosol before it is gelled. The resulting mixture is then finished by conventional gelling, aging, drying and calcination steps as explained hereinbefore. One preferred way of incorporating this component is an impregnation step wherein the porous carrier material is impregnated with a suitable nickel-containing solution either before, during or after the carrier material is calcined. Preferred impregnation solutions are aqueous solutions of water-soluble, decomposable nickel compounds such as nickel bromate, nickel bromide, nickel perchlorate, nickel chloride, nickel fluoride, nickel iodide, nickel nitrate, nickel sulfate, and the like compounds. Best results are ordinarily obtained when the impregnation solution is an aqueous solution of nickel chloride or nickel nitrate. This nickel component can be added to the carrier material, either prior to, simultaneously with, or after the other metallic components are combined therewith. Best results are usually achieved when this component is added simultaneously with the other metallic components. In fact, excellent results have been obtained, with a one step impregnation procedure using an aqueous solution comprising chloroplatinic acid, nickel chloride, hydrochloric acid and a suitable compound of the desired Group IVA metal.

A preferred ingredient of the catalytic composite, employed in the present invention is a halogen component. Accordingly, a preferred embodiment of the present invention involves using a catalytic composite comprising a combination of catalytically effective amounts of a platinum group component, a nickel component, a Group IVA metallic component, and a halogen component with an alumina carrier material. Although the precise form of the chemistry of the association of the halogen component with the carrier material is not entirely known, it is customary in the art to refer to the halogen component as being combined with the carrier material, or with the other ingredients of the catalyst in the form of the halide (e.g. as the chloride). This combined halogen may be either fluorine, chlorine, iodine, bromine, or mixtures thereof. Of these, fluorine and especially chlorine are preferred for the purposes of the present invention.

The halogen component may be added to the carrier material in any suitable manner either during preparation of the support or before or after the addition of the other components. For example, the halogen may be added at any stage of the preparation of the carrier material or to the calcined carrier material, as an aqueous solution of an acid such as hydrogen fluoride, hydrogen chloride, hydrogen bromide, etc. The halogen component or a portion thereof may be combined with the carrier material during the impregnation of the latter with the platinum group component; for example, through the utilization of a mixture of chloroplatinic acid, and hydrogen chloride. In another situation, the alumina hydrosol which is typically utilized to form the preferred alumina carrier material may contain halogen and thus contribute at least a portion of the halogen component to the final composite. The halogen will be typically combined with the carrier material in an amount sufficient to result in a final composite that contains about 0.1 to about 3.5 wt. percent and preferably about 0.5 to about 1.5 wt. percent of halogen calculated on an elemental basis.

Regardless of the details of how the components of the catalyst are combined with the porous carrier material, the final catalyst generally will be dried at a temperature of about 200 to about 600° F. for a period of from about 2 to about 24 hours or more, and finally calcined at a temperature of about 700° F. to about 1100° F. in an air atmosphere for a period of about 0.5 to about 10 hours in order to convert the metallic components substantially to the oxide form. In the case where a halogen component is utilized in the catalyst, best results are generally obtained when the halogen content of the catalyst is adjusted during the calcination step by including water and a halogen or a halogen-containing compound in the air atmosphere utilized. In particular, when the halogen component of the catalyst is chlorine, it is preferred to use a mole ratio of $H_2O$ to HCl of about 20:1 to about 100:1 during at least a portion of the calcination step in order to adjust the final chlorine content of the catalyst to a range of about 0.5 to about 1.5 wt. percent.

It is preferred that the resultant calcined catalytic composite be subjected to a substantially water-free reduction step prior to its use in the present method. This step is designed to insure a uniform and finely divided dispersion of the metallic components throughout the carrier material. Preferably, substantially pure and dry hydrogen (i.e., less than 20 vol. p.p.m. $H_2O$) is used as the reducing agent in this step. The reducing agent is contacted with the calcined catalyst at a temperature of about 800° F. to about 1200° F. and for a period of time of about 0.5 to 10 hours or more effective to substantially reduce at least the platinum group component to the elemental state. This reduction treatment may be performed in situ as part of a start-up sequence if precautions are taken to predry the plant to a substantially water-free state and if substantially water-free hydrogen is used.

The resulting reduced catalytic composite may, in some cases, be beneficially subjected to a presulfiding operation designed to incorporate in the catalytic composite from about 0.05 to about 0.5 wt. percent sulfur calculated on an elemental basis. Preferably, this presulfiding treatment takes place in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 moles of hydrogen per mole of hydrogen sulfide at conditions sufficient to effect the desired incorporation of sulfur, generally including a temperature ranging from about 50° F. up to about 1100° F. or more. It is generally a good practice to perform this optional presulfiding step under substantially water-free conditions.

According to the present invention, a hydrogen charge stock boiling in the gasoline range and hydrogen are contacted with a catalyst of the type described above in a hydrocarbon conversion zone at synthetic natural gas production conditions. This contacting step may be accomplished by using the catalyst in the fixed bed system, a moving bed system, a fluidized bed system, or in a batch type operation; however, in view of the danger of attrition losses of the valuable catalyst and of well known operational advantages, it is preferred to use a fixed bed system. In this system, a hydrogen-rich gas and the charge stock are preheated by any suitable heating means to the desired reaction temperture and then are passed, into a conversion zone containing a fixed bed of the catalyst type previously characterized. It is, of course, understood that the conversion zone may be one or more separate reactors with suitable means therebetween to insure that the desired conversion temperature is maintained at the entrance to each reactor. It is also important to note that the reactants may be contacted with the catalyst bed in either upward, downward, or radial flow fashion with the latter being preferred. In addition, the reactants may be in the liquid phase, a mixed liquid-vapor phase, or a vapor phase when they contact the catalyst with best results obtained in the vapor phase.

The hydrocarbon charge stock that is used in this contacting step is a hydrocarbon fraction containing naphthenes and paraffins that boil within the gasoline range. The preferred charge stocks are those consisting essentially of naphthenes and paraffins, although in many cases aromatics are also present. This preferred class includes straight run gasolines, natural gasoline, synthetic gasolines, and the like. On the other hand, it is frequently advantageous to charge thermally or catalytically cracked gasolines or higher boiling fractions thereof. Mixtures of straight run and cracked gasoline can also be used to advantage. The gasoline charge stock may be a full boiling gasoline having an initial boiling point of from about 50° F. to about 150° F. and an end boiling point within the range of from about 325° F. to about 425° F., or may be a selected fraction thereof which generally will be a higher boiling fraction commonly referred to as a heavy naphtha—for example, a naphtha boiling in the range of $C_7$ to 400° F. It is preferred that these charge stocks be treated by conventional catalytic pretreatment methods such as hydrorefining, hydrotreating, hydrodesulfurization, etc., to remove substantially all sulfurous, nitrogenous and water-yielding contaminants therefrom, and to saturate any olefins that may be contained therein.

Following the contacting of the hydrocarbon charge stock and hydrogen with the hereinbefore described catalyst, an effluent stream is withdrawn from the conversion zone containing the catalyst and passed there a suitable condensing means, designed to lower the temperature thereof to a range of about 25 to about 100° F., and thereafter passed to a gas-separating zone, typically maintained at about 25° F. to 100° F. wherein a hydrogen- and methane-rich gas is separated from a liquid hydrocarbon product. This hydrogen- and methane-rich gas constitutes the synthetic natural product stream of the present invention. Depending upon the exact composition of the catalyst used in the contacting step, the composition of the charge stock and on the specific conditions utilized in the contacting step, this synthetic natural gas stream will contain about 20 to about 60% methane in admixture with hydrogen. If the amount of hydrogen contained in this gas stream is too high for immediate use of same in conventional applications of natural gas streams, a portion of the hydrogen in this stream can be separated therefrom in a cryogenic separating system by methods well known to those skilled in the separation art in order to produce a methane rich stream of the desired concentration. The hydrogen-rich gas stream recovered from the cryogenic separation system, if such is employed, can then be utilized in any of the ways that have been traditionally practiced in refineries to dispose of the net hydrogen production from a catalytic reforming process. For example, it can be employed in a process for hydrorefining or hydrotreating of sulfurous and nitrogenous contaminate-containing hydrocarbon streams in the conventional manner. Likewise, a significant portion of this hydrogen-rich gas stream obtained from the cryogenic separation system can be recycled to the hereinbefore described contacting step in order to supply at least a portion of the hydrogen reactant for use therein. The liquid hydrocarbon phase from the gas separating zone is then withdrawn therefrom and passed to a fractionation system, typically comprising a demethanizer and debutanizer designed to produce a methane rich gas stream, a $C_2$ to $C_4$ off gas stream and $C_5+$ high octane product reformate stream. The methane-rich gas stream obtained as overhead from the demethanizer column in the fractionation system is preferably commingled with the synthetic natural gas stream recovered from the gas separating zone as previously described in order to enrich the methane content thereof. It is to be noted that the downstream processing of the effluent stream from the contacting step of the present invention to recover the synthetic natural gas stream is a matter of conventional engineering judgment on the basis of the particular economics of each case and as such is subject to a considerable amount of choices. The essential point to be noted is that the effluent stream from the contacting step contains a significant amount of methane which can be recovered in the form of a methane-rich synthetic natural gas stream in any one of a number of fractionation and cryogenic separation schemes which would suggest themselves to someone of ordinary skill in this art.

The synthetic natural gas production conditions used in the present invention are ordinarily determined as a function of the characteristics of the particular charge stock being treated, the exact composition of the catalyst being used, and the amount of SNG it is desired to produce. For a given charge stock, catalyst composition and desired yield of SNG, conditions are selected from the following ranges in order to optimize the yield of SNG while simultaneously producing a high octane $C_5+$ reformate. The relevant conditions are: a pressure of about 0 to about 350 p.s.i.g. and preferably about 50 to about 200 p.s.i.g.; a liquid hourly space velocity of about 0.5 to about 3 hr.$^{-1}$ and preferably about 1 to about 2 hr.$^{-1}$, a reactor inlet temperature of about 900 to about 1200° F. and preferably about 900 to about 1000° F.; and a hydrogen to hydrocarbon mole ratio of about 1:1 to about 5:1 and perferably about 2:1 to about 4:1. As will be demonstrated in the following example, excellent results have been obtained with a catalyst comprising alumina containing about 1.75 wt. percent nickel, about 0.5 wt. percent tin, about 0.375 wt. percent platinum, and about 1 wt. percent chlorine at a temperature of about 940 to 975° F., a pressure of about 100 p.s.i.g., a liquid hourly space velocity of 1.5 hr.$^{-1}$ and a hydrogen to hydrocarbon mole ratio of about 3:1.

A preferred mode of operation of my invention involves limiting the opportunity for carbonaceous deposits to form on the catalyst by continuously regenerating the catalyst according to any one of the conventional carbon-burning procedures when the catalyst has accumulated an on-stream life of about 100 to about 500 hours or less. In a swing-bed system, this preferred mode of operation would set the frequency of regeneration of each catalyst bed. Likewise, in a fluidized bed system or in the moving bed system, the residence time of the catalyst within the conversion zone would be preferably set to insure that the carbon on the catalyst stays below that which would be observed in about 100 to about 500 continuous hours of operation. In a semi-regenerative, fixed-bed system for accomplishing the basic contacting step of the present invention, this limitation on catalyst life would imply a relatively high frequency of shutdown for catalyst regeneration in order to achieve the optimum amount of synthetic natural gas production. This type of high frequency regeneration operation is well within the state of the art for any of these alternative methods of accomplishing the basic contacting step of the present invention.

The following example is presented to illustrate the benefits associated with the method of the present invention. It is intended to be illustrative and not restrictive.

EXAMPLE

In order to highlight the significant SNG yield and high octane reformate yield associated with the method of the present invention, a series of three runs were made in a laboratory scale pilot plant. The runs were all made with the same charge stock and at the same reactor conditions. The only material difference between the runs was the composition of the catalyst utilized therein. Catalysts A and B were control catalysts designed, respectively, to show the response of the high quality bimetallic reforming catalyst to the conditions of the test and the response of a nickel-containing trimetallic catalyst which is outside the scope of the present invention. Catalyst C, on the other hand, was prepared in accordance with the significant findings of the present invention as hereinbefore described.

Catalyst A was prepared by impregnating a conventional gamma-alumina carrier material with an aqueous solution containing chloroplatinic acid, stannic chloride and hydrogen chloride in amounts sufficient to result in the final catalyst containing about 0.5 wt. percent tin and 0.375 wt. percent platinum. The resulting impregnated carrier was then subjected to drying, calcining, halogen-adjustment and reduction steps, as previously described, which resulted in a catalyst comprising gamma-alumina containing, on an elemental basis, 0.375 wt. percent platinum, 0.5 wt. percent tin and 1.01 wt. percent chlorine.

Catalyst B was prepared in an analogous manner to catalyst A except that a sufficient amount of nickel chloride was added to the impregnation solution to result in the final catalyst containing 0.5 wt. percent nickel. That is to say, catalyst B comprised a gamma-alumina carrier material containing, on an elemental basis, 0.50 wt. percent tin, 0.375 wt. percent platinum, 0.50 wt. percent nickel and 1.02 wt. percent chlorine.

Catalyst C was prepared in a manner analogous to catalyst B except that the amount of nickel chloride added to the impregnation solution was increased in an amount sufficient to result in a final catalyst containing 1.75 wt. percent nickel. Thus, catalyst C comprised a gamma-alumina carrier material containing, on an elemental basis, 0.5 wt. percent tin, 0.375 wt. percent platinum, 1.75 wt. percent nickel and 0.99 wt. percent chlorine.

In all three catalysts the same gamma carrier material was utilized as a starting material and it comprised $\frac{1}{16}$ inch spherical particles prepared by the method given in the teaching of U.S. Pat. No. 2,620,314. The chloroplatinc acid, stannic chloride, hydrogen chloride and nickel chloride utilized in these preparation procedures were all stock laboratory reagents.

All three runs were performed in a laboratory scale catalytic reforming plant of conventional design comprising a reactor containing a fixed bed of the catalyst being tested, a gas separating zone, a debutanizer column and conventional heating pumping, compressing and cooling means. The flow scheme utilized involved: (1) heating a mixture of the hydrocarbon charge stock and a hydrogen recycle stream to the desired conversion temperature; (2) passing the resulting heated mixture downflow into a reactor containing the catalyst being tested as a fixed bed; and (3) withdrawing an effluent stream containing all of the products from the reactor, cooling it in the conventional manner to about 55° F., and passing the resulting cooled effluent stream into a gas-separating zone wherein a hydrogen- and methane-rich gas phase was allowed to separate from a liquid hydrocarbon phase. A portion of this gas phase was then withdrawn from the separating zone, passed through a high surface area sodium scrubber and the resulting substantially water-free gas stream was then recycled to the reactor in order to supply the necessary hydrogen therefor. The excess of the gas phase from the gas separator over that needed to sustain plant pressure at the desired level was recovered as excess separtor gas. The hydrocarbon phase from the separating zone was likewise withdrawn and passed to a debutanizer column of conventional design wherein light hydrocarbon products (i.e., $C_1$ to $C_4$) where taken overhead and a $C_5+$ product reformate stream recovered as bottoms. It is to be noted that a catalytic reforming process operated in accordance with the present invention would include suitable means for recovery of an SNG gas stream according to the techniques hereinbefore discussed. In these particular tests, the SNG production capabilities of the catalyst undergoing analysis was measured to analyzing the excess separator gas and the debutanizer overhead gas stream to determine their total methane content. The numbers for production of methane directly correlate with SNG production capability as previously explained. In all of the runs, the reactor conditions utilized with the same. Each run consisted of a series of a series of six periods of 24 hours each. Each of these test periods comprised in turn a 12 hour lineout period followed by a 12 hour test period during which product reformate samples and gas samples were collected and analyzed. The reactor conditions employed in all runs were: a liquid hourly space velocity of 1.5 hr.$^{-1}$, a reactor pressure of 100 p.s.i.g., a recycle gas to hydrocarbon mole ratio of 5:1 and a reactor temperature which was continuously adjusted throughout the test in order to achieve and maintain a $C_5+$ product reformate target octane of 102 F-1 clear.

In all of these runs, the same charge stock was utilized and its pertinent characteristics are given in Table I.

TABLE I

Analysis of Charge Stock

| | |
|---|---|
| API gravity at 60 ° F. | 60.4 |
| Initial boiling point, ° F. | 184 |
| 10% boiling point, ° F. | 205 |
| 50% boiling point, ° F. | 256 |
| 90% boiling point, ° F. | 321 |
| End boiling point, ° F. | 360 |
| Sulfur, wt. p.p.m. | 0.5 |
| Nitrogen, wt. p.p.m. | 0.1 |
| Aromatics, vol. percent | 8 |
| Paraffins, vol. percent | 71 |
| Naphthenes, vol. percent | 21 |
| Water, wt. p.p.m. | 5.9 |
| Octane No., F-1 clear | 40 |

The results of these three runs are given in Table II as a function of catalyst and period numbers in terms of reactor temperature in degrees F. necessary to maintain the 102 F-1 clear target octane, excess separator gas in standard cubic feet per barrel of charge (s.c.f.b.), debutanizer gas in s.c.f.b., the total gas make in s.c.f.b., ratio of debutanizer gas to total gas make, $C_5+$ yield in liquid volume percent of charge, methane yield in s.c.f.b., the $C_2$ to $C_4$ yield in s.c.f.b., ratio of methane yield to total gas yield and the ratio of $C_2-C_4$ yield to total gas yield. It is to be noted that all of these results were corrected to 100% recovery at 102 of F-1 clear octane number by appropriate computer analysis.

With reference now to the results of the comparison tests presented in Table II, it can be ascertained that there is a very surprising result exhibited by this data. This result is immediately evident in a comparison of the methane production exhibited by Catalyst C as contrasted to those shown for Catalysts B and A. Catalyst C in all cases produced methane in an amount which was about 4 to 8 times greater than that observed for Catalysts A and B. A good measure for capability to selectively produce methane for a given catalyst is obtained by looking at the ratio of methane production to total gas production (i.e., the selectivity for methane relative to the total gas make). On this basis Catalyst C had a selectivity of 0.24 to about 0.35; in contrast, Catalysts B and C were consistently below 0.07 in methane selectivity.

This four fold increase in methane production was not obtained at any substantial sacrifice in $C_5+$ yield. In all cases the $C_5+$ yield for these catalysts was in the range of 70 to 77 volume percent of the charge stock which are very good yields considering the relatively high severity conditions provided in the runs.

Likewise, the activity characteristics of the three catalysts were comparable. Activity is perhaps best judged by looking at the temperature required to maintain the target octane level. On this basis Catalyst C was consistently more active than Catalysts B and A throughout the test.

The situation is similar with regards to stability characteristics of the catalysts. As was pointed out hereinbefore stability of a catalyst is ordinarily determined by looking at the rates of change of (1) reactor temperature necessary to maintain octane and (2) $C_5+$ yield. In the former case activity stability is the quantity measured and in the latter case it is yield stability. With reference to the data presented in Table II, it can be seen that the activity stability and yield stability characteristics of Catalyst C are comparable in all cases to those observed with the Control Catalysts, Catalysts A and B.

In summary, the results of these runs presented in Table II evidence the significant and material capabilities of a reforming process operated in accordance with the present invention to produce substantial quantities of methane (i.e. the major component of the synthetic natural gas stream) at very little sacrifice in $C_5+$ yield and with significantly improved activity characteristics of the catalyst.

It is intended to cover by the following claims, all changes, variations and modifications of the above disclosure of the present invention which would be self-evident to the man of ordinary skill in the hydrocarbon conversion art.

TABLE II.—RESULTS OF COMPARISON TESTS

| Period number | T, ° F. | S-gas, SCFB | D-gas, SCFB | Total gas, SCFB | D-gas, total gas | $C_5+$, L.V., percent | $CH_4$, SCFB | $C_2-C_4$, SCFB | $CH^4$, total gas | $C_2-C_4$, gas |
|---|---|---|---|---|---|---|---|---|---|---|
| Catalyst A—0.5 wt. percent Sn, 0.375 wt percent Pt and 1.01 wt. percent Cl. ||||||||||
| 1 | 959.5 | 1,773 | 89 | 1,862 | .048 | 75.6 | 67 | 285 | .036 | .153 |
| 2 | 961.5 | 1,791 | 90 | 1,881 | .048 | 76.0 | 75 | 266 | .040 | .141 |
| 3 | | | | | | | | | | |
| 4 | 977 | 1,766 | 89 | 1,855 | .048 | 73.6 | 82 | 363 | .044 | .196 |
| 5 | | | | | | | | | | |
| 6 | 986.5 | 1,777 | 89 | 1,866 | .048 | 75.0 | 78 | 293 | .042 | .157 |
| Catalyst B—0.50 wt. percent Sn, 0.375 wt. percent Pt, 0.50 wt. percent Ni and 1.02 wt. percent Cl ||||||||||
| 1 | 965.5 | 1,774 | 84 | 1,858 | .045 | 74.5 | 88 | 303 | .0475 | .163 |
| 2 | 972.5 | 1,725 | 72 | 1,797 | .040 | 76.9 | 124 | 243 | .069 | .135 |
| 3 | 983.5 | 1,698 | 80 | 1,778 | .045 | 76.3 | 77 | 271 | .043 | .153 |
| 4 | 994.0 | 1,703 | 93 | 1,796 | .056 | 73.8 | 96 | 320 | .053 | .178 |
| 5 | 1,001.0 | 1,665 | 93 | 1,758 | .053 | 74.4 | 97 | 311 | .055 | .177 |
| 6 | 1,011.0 | 1,666 | 101 | 1,767 | .057 | 72.8 | 105 | 342 | .059 | .193 |
| Catalyst C—0.50 wt. percent Sn, 0.375 wt. percent Pt, 1.75 wt. percent Ni and 0.99 wt. percent Cl ||||||||||
| 1 | 943 | 1,718 | 56 | 1,774 | .032 | 73.2 | 628 | 96 | .354 | .054 |
| 2 | 946 | 1,722 | 58 | 1,780 | .033 | 73.3 | 631 | 159 | .354 | .089 |
| 3 | 947.5 | 1,683 | 54 | 1,737 | .031 | 72.6 | 610 | 157 | .350 | .090 |
| 4 | | | | | | | | | | |
| 5 | | | | | | | | | | |
| 6 | 968 | 1,691 | 95 | 1,786 | .053 | 70.4 | 439 | 297 | .246 | .166 |

I claim as my invention:

1. A method for simultaneously producing a synthetic natural gas stream and a high octane reformate stream, said method comprising contacting a hydrocarbon charge stock boiling in the gasoline range and hydrogen, at synthetic natural gas production conditions including a temperature of about 900 to about 1200° F., a pressure of about 0 to about 350 p.s.i.g., a liquid hourly space velocity of about 0.5 to about 3 hrs.$^{-1}$ and a mole ratio of hydrogen to hydrocarbon of about 5:1, with a catalytic composite comprising a porous carrier material containing, on an elemental basis, about 0.01 to about 2 wt. percent of a platinum group metal, about 1 to about 5 wt. percent nickel and about 0.01 to about 5 wt. percent of a Group IVA metal.

2. A method as defined in Claim 1 wherein the platinum group metal is platinum.

3. A method as defined in Claim 1 wherein the Group IVA metal is germanium.

4. A metal as defined in Claim 1 wherein the Group IVA metal is tin.

5. A method as defined in Claim 1 wherein the Group IVA metal is lead.

6. A method as defined in Claim 1 wherein the porous carrier material is a refractory inorganic oxide.

7. A method as claimed in Claim 6 wherein the refractory inorganic oxide is alumina.

8. A method as defined in Claim 1 wherein the catalytic composite contains combined halogen.

9. A method as defined in Claim 8 wherein the catalytic composite contains, on an elemental basis, about 0.1 to about 3.5 wt. percent halogen.

10. A method as defined in Claim 8 wherein the halogen is combined chlorine.

11. A method as defined in Claim 8 wherein the catalytic composite contains about 0.05 to about 1 wt. percent platinum group metal, about 1.5 to about 3 wt. percent nickel, about 0.5 to about 1.5 wt. percent halogen and about 0.05 to about 2 wt. percent tin.

References Cited

UNITED STATES PATENTS

| | | | |
|---|---|---|---|
| 2,981,696 | 4/1961 | Hervert et al. | 252—441 |
| 3,271,325 | 9/1966 | Davies et al. | 252—466 |
| 3,578,584 | 5/1971 | Hayes | 208—139 |
| 3,645,888 | 2/1972 | Hayes | 208—139 |
| 3,632,503 | 1/1972 | Hayes | 208—139 |
| 3,580,970 | 5/1971 | Swift | 260—621 H |
| 3,420,642 | 1/1969 | Percival | 48—197 R |
| 3,506,417 | 4/1970 | Hepp et al. | 48—197 R |
| 3,576,899 | 4/1971 | Ishiguro et al. | 208—112 |

DELBERT E. GANTZ, Primary Examiner

J. W. HELLWEGE, Assistant Examiner

U.S. Cl. X.R.

48—197 R; 208—112, 138